US012747676B2

(12) United States Patent
Miller et al.

(10) Patent No.: US 12,747,676 B2
(45) Date of Patent: Sep. 29, 2026

(54) LUBRICATION SYSTEM FOR A TURBINE ENGINE

(71) Applicant: General Electric Company, Schenectady, NY (US)

(72) Inventors: Brandon W. Miller, Middletown, OH (US); Andrew Hudecki, Milford, OH (US); Ryan T. Roehm, West Chester, OH (US); Ravindra Shankar Ganiger, Bengaluru (IN)

(73) Assignee: GENERAL ELECTRIC COMPANY, Evendale, OH (US)

( * ) Notice: Subject to any disclaimer, the term of this patent is extended or adjusted under 35 U.S.C. 154(b) by 122 days.

(21) Appl. No.: 18/435,651

(22) Filed: Feb. 7, 2024

(65) Prior Publication Data

US 2025/0163829 A1 May 22, 2025

Related U.S. Application Data

(60) Provisional application No. 63/517,792, filed on Aug. 4, 2023.

(51) Int. Cl.
*F01D 25/20* (2006.01)
*F01M 11/00* (2006.01)
*F16H 57/04* (2010.01)

(52) U.S. Cl.
CPC ......... *F01D 25/20* (2013.01); *F16H 57/0435* (2013.01); *F16H 57/0442* (2013.01); *F01M 2011/0095* (2013.01); *F05D 2260/98* (2013.01)

(58) Field of Classification Search
CPC ...... F01D 25/18; F01D 25/20; F16H 57/0435; F16H 57/0442; F16H 57/045; F01M 2011/0095; F05D 2260/98
See application file for complete search history.

(56) References Cited

U.S. PATENT DOCUMENTS 3,147,821 A 9/1964 Eggenberger
4,170,873 A 10/1979 Milo
(Continued)

FOREIGN PATENT DOCUMENTS

CN 107091319 A 8/2017
FR 3127024 A1 3/2023
(Continued)

OTHER PUBLICATIONS

Rambo, et al., U.S. Appl. No. 63/514,172, filed Jul. 18, 2023.
Miller, et al., U.S. Appl. No. 18/481,582, filed Oct. 5, 2023.

*Primary Examiner* — Minh Truong
(74) *Attorney, Agent, or Firm* — Venable LLP; Michele V. Frank

(57) ABSTRACT

A lubrication system for a turbine engine having one or more rotating components. The lubrication system includes a primary reservoir that stores a lubricant therein. A primary lubrication system supplies the lubricant from the primary reservoir to the one or more rotating components during normal operation of the turbine engine. An auxiliary lubrication system includes an auxiliary reservoir in fluid communication with the primary reservoir and the one or more rotating components. The auxiliary reservoir receives the lubricant from the primary reservoir and is positioned at substantially a six o'clock position of the turbine engine. The auxiliary lubrication system supplies the lubricant from the auxiliary reservoir to the one or more rotating components based on at least one of a pressure of the lubricant in the primary lubrication system, a pressure of fuel in the turbine engine, or a pressure of hydraulics of the turbine engine.

20 Claims, 3 Drawing Sheets

(56) References Cited

U.S. PATENT DOCUMENTS

| | | | | |
|---|---|---|---|---|
| 4,245,465 | A | 1/1981 | Milo | |
| 4,511,016 | A | 4/1985 | Doell | |
| 4,629,033 | A | 12/1986 | Moore et al. | |
| 4,845,483 | A | 7/1989 | Negishi | |
| 7,662,059 | B2 | 2/2010 | McCune | |
| 7,815,536 | B2 | 10/2010 | Jansen et al. | |
| 7,849,668 | B2 | 12/2010 | Sheridan | |
| 7,883,438 | B2 | 2/2011 | McCune | |
| 8,007,253 | B2 | 8/2011 | Dooley | |
| 8,307,626 | B2 * | 11/2012 | Sheridan | F01D 25/20 184/29 |
| 8,702,373 | B1 | 4/2014 | Valva et al. | |
| 9,086,055 | B2 | 7/2015 | Subramaniam et al. | |
| 9,903,227 | B2 * | 2/2018 | Cigal | F01D 25/18 |
| 10,167,873 | B2 | 1/2019 | Sheridan et al. | |
| 10,196,926 | B2 | 2/2019 | Ketchum et al. | |
| 10,208,624 | B2 | 2/2019 | Duong et al. | |
| 10,267,233 | B2 * | 4/2019 | Mastro | F02C 3/107 |
| 10,316,855 | B2 | 6/2019 | Mastro | |
| 10,371,007 | B2 | 8/2019 | Cigal et al. | |
| 10,494,951 | B2 * | 12/2019 | James | F02C 7/06 |
| 10,513,949 | B2 | 12/2019 | Parnin et al. | |
| 10,526,913 | B2 | 1/2020 | Roberge | |
| 10,570,824 | B2 | 2/2020 | Schwarz et al. | |
| 10,577,974 | B2 | 3/2020 | Valva et al. | |
| 10,634,053 | B2 * | 4/2020 | Schwarz | F16H 57/0471 |
| 10,801,413 | B2 | 10/2020 | Roberge | |
| 11,085,521 | B2 | 8/2021 | Edwards et al. | |
| 11,092,037 | B2 | 8/2021 | Valva et al. | |
| 11,203,974 | B2 | 12/2021 | Sheridan | |
| 11,598,409 | B2 | 3/2023 | Balistreri et al. | |
| 2011/0168494 | A1 | 7/2011 | Subramaniam et al. | |
| 2014/0069744 | A1 | 3/2014 | Scipio et al. | |
| 2014/0331639 | A1 | 11/2014 | Raimarckers et al. | |
| 2015/0135663 | A1 * | 5/2015 | Beier | F02C 7/06 55/461 |
| 2016/0376949 | A1 | 12/2016 | Parnin | |
| 2019/0316672 | A1 * | 10/2019 | Davies | F16H 57/0479 |
| 2019/0376416 | A1 | 12/2019 | Mastro | |
| 2020/0392866 | A1 * | 12/2020 | Younes | F16C 19/52 |
| 2021/0116015 | A1 | 4/2021 | Mueller | |
| 2023/0349326 | A1 * | 11/2023 | Turnquist | F02C 7/36 |

FOREIGN PATENT DOCUMENTS

| | | | |
|---|---|---|---|
| FR | 3127025 | A1 | 3/2023 |
| FR | 3129436 | A1 | 5/2023 |
| FR | 3129690 | A1 | 6/2023 |
| FR | 3130747 | A1 | 6/2023 |
| FR | 3130875 | A1 | 6/2023 |
| WO | 2021198601 | A1 | 10/2021 |

* cited by examiner

LUBRICATION SYSTEM FOR A TURBINE ENGINE

CROSS-REFERENCE TO RELATED APPLICATIONS

This application claims priority to U.S. Provisional Application No. 63/517,792, filed Aug. 4, 2023, the entire contents of which is hereby incorporated by reference.

TECHNICAL FIELD

The present disclosure relates generally to a lubrication system, for example, in a turbine engine.

BACKGROUND

Turbine engines generally includes a fan and a core section arranged in flow communication with one another. Turbine engines includes one or more rotating components. A lubrication system provides a lubricant to the one or more rotating components of the turbine engines.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, or structurally similar elements.

DETAILED DESCRIPTION

Figure 1:
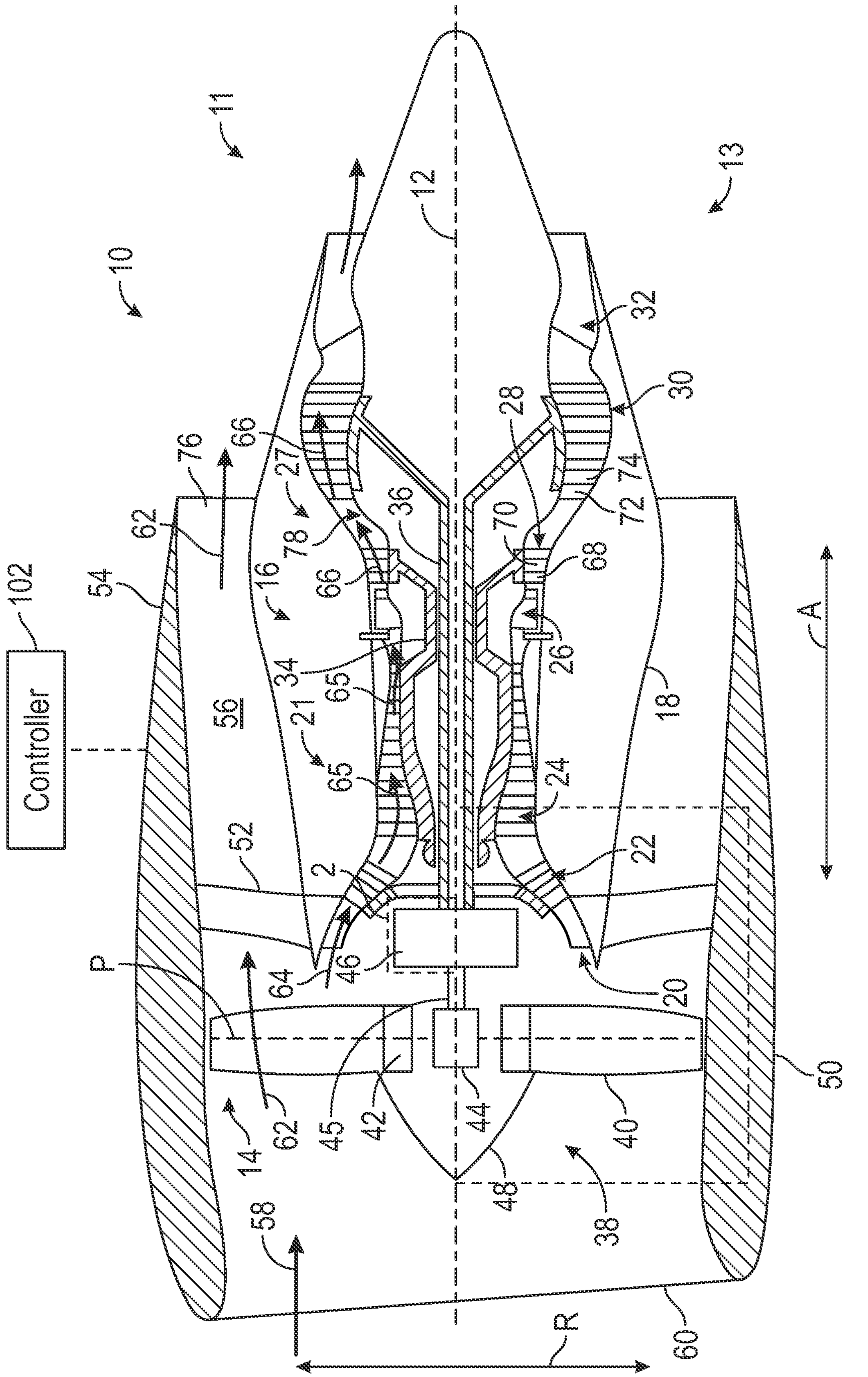
FIG. 1 is a schematic cross-sectional diagram of a turbine engine, taken along a longitudinal centerline axis of the turbine engine, according to the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms “first,” “second,” and “third” may be used interchangeably to distinguish one component from another and are not intended to signify location or importance of the individual components.

The terms “upstream” and “downstream” refer to the relative direction with respect to fluid flow in a fluid pathway. For example, “upstream” refers to the direction from which the fluid flows, and “downstream” refers to the direction to which the fluid flows.

The terms “forward” and “aft” refer to relative positions within a turbine engine or vehicle, and refer to the normal operational attitude of the turbine engine or vehicle. For example, with regard to a high-bypass turbine engine, forward refers to a position closer to an engine inlet and aft refers to a position closer to an engine nozzle or exhaust. In one example, in a reverse flow turbine engine, forward refers to a position closer to the engine nozzle or exhaust and aft refers to a position closer to an engine inlet.

The terms “coupled,” “fixed,” “attached,” “connected,” and the like, refer to both direct coupling, fixing, attaching, or connecting, as well as indirect coupling, fixing, attaching, or connecting through one or more intermediate components or features, unless otherwise specified herein.

The singular forms “a,” “an,” and “the” include plural references unless the context clearly dictates otherwise.

As used herein, the terms “axial” and “axially” refer to directions and orientations that extend substantially parallel to a centerline of the turbine engine. Moreover, the terms “radial” and “radially” refer to directions and orientations that extend substantially perpendicular to the centerline of the turbine engine. In addition, as used herein, the terms “circumferential” and “circumferentially” refer to directions and orientations that extend arcuately about the centerline of the turbine engine.

As used herein, “normal operation” of a turbine engine is intended to mean when the turbine engine is operating, and a primary lubrication system of the turbine engine is supplying lubricant to one or more rotating components of the turbine engine.

As used herein, “windmill” or “windmilling” is a condition when the fan and the low-pressure shaft of the turbine engine continue to rotate at low speeds, while the high-pressure shaft rotates slowly or even stops. Windmilling can occur when the turbine engine is shut down, but air still flows across the fan, such as during an in-flight engine shutdown or when the turbine engine is on the ground and the fan is rotating in the presence of wind when the turbine engine is shutdown. During a shutdown, e.g., while the aircraft is on the ground, the fan may also rotate in either direction depending upon the stationary position of the turbine engine relative to the ambient wind. Airflow entering the fan exhaust may exit the fan inlet in an opposite direction as a direction of operation and cause the fan to rotate in an opposite rotational direction compared to the intended operational rotational direction.

As used herein, “activate” or “activating” an auxiliary lubrication system includes causing lubricant to flow within the auxiliary lubrication system. For example, activating the auxiliary lubrication system includes powering an auxiliary pump to pump the lubricant through the auxiliary lubrication system or closing a drain valve or a scavenge valve to fill a secondary reservoir with the lubricant. In some embodiments, the drain valve or the scavenge valve is opened when the auxiliary lubrication system is active, and another valve closes to fill the secondary reservoir with lubricant.

As used herein, to “inactivate” an auxiliary lubrication system or an “inactive” auxiliary lubrication system includes preventing the lubricant from flowing within the auxiliary lubrication system. For example, when the auxiliary lubrication system is inactive, the auxiliary pump is powered off and is prevented from pumping the lubricant through the auxiliary lubrication or the drain valve is opened to prevent the secondary reservoir from being filled with the lubricant. In some embodiments, the drain valve or the scavenge valve is closed when the auxiliary lubrication system is inactive, and another valve opens to prevent the secondary reservoir from being filled with the lubricant.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially" is not to be limited to the precise value specified. In at least some instances, the approximating language may correspond to the precision of an instrument for measuring the value, or the precision of the methods or the machines for constructing the components or the systems or manufacturing the components or the systems. For example, the approximating language may refer to being within a one, a two, a four, a ten, a fifteen, or a twenty percent margin in either individual values, range(s) of values or endpoints defining range(s) of values.

The present disclosure provides for a turbine engine having a lubrication system. The turbine engine includes a fan having a fan shaft. The turbine engine includes one or more rotating components that rotate within the turbine engine. The one or more rotating components can include, for example, one or more shafts, one or more gears, or one or more bearings including one or more engine bearings for the one or more shafts of the turbine engine (e.g., a low-pressure shaft or a high-pressure shaft) or one or more gear bearings for a gear assembly of the turbine engine. The one or more gear bearings allow rotation of the one or more gears of the gear assembly about the one or more gear bearings. In one embodiment, one or more of the bearings are journal bearings. The one or more bearings can include any type of bearings, such as, for example, roller bearings, or the like. The lubrication system supplies a lubricant (e.g., oil) to the one or more rotating components. The lubrication system includes one or more tanks (e.g., a primary reservoir) that store lubricant therein, and a primary lubrication system having a primary pump and a primary lubricant supply line. During normal operation of the turbine engine, the primary pump pumps the lubricant from the primary reservoir to the one or more rotating components through the primary lubricant supply line. The lubrication system includes one or more primary drain valves that open to allow the lubricant to flow from the primary reservoir to the one or more rotating components.

The bearings, especially, journal bearings, are hydrodynamic bearings that typically require a steady supply of lubricant during all operational phases of the turbine engine to properly lubricate the bearings to prevent damage due to sliding contact for hydrodynamic journal bearings or even for the generic gear mesh interface. The shafts of the turbine engine may experience long duration, continued rotation following a shutdown of the turbine engine, such as that occurring during windmilling. In such instances, the one or more rotating components, and, in particular, the one or more bearings, can be affected by not receiving enough lubricant for lubricating the one or more rotating components. For example, during windmilling, the rotational speed of the shafts may be too low to power the primary pump to pump the lubricant to the one or more rotating components. In some instances, e.g., during operation of the turbine engine (e.g., in-flight), the lubrication system may lose pressure (e.g., due to a failure of the primary pump or other components of the primary lubrication system), such that the primary lubrication system is unable to provide the lubricant to the one or more rotating components via the primary pump and the primary lubricant supply line.

The criticality of the lubricant interruptions increases when the bearings are journal bearings, since the absence of lubricant at the journal bearings can lead to a journal bearing failure and subsequent gearbox failure, which may cause the low-speed shaft to lock up permanently. Such a failure of the journal bearings is referred to as a journal bearing seizure and occurs when there is contact between the planet pin and the bore of the gear, thereby causing a significant increase of wear and friction that leads to bearing failure. If contact occurs between the journal bearing and the pin during high-power operation, the two components can become welded together due to the high temperature from the friction.

Some turbine engines include an auxiliary lubrication system that includes an auxiliary pump to supply lubricant to the one or more rotating components to prevent damage to the rotating components due to inadequate lubricant supply during windmilling. Such auxiliary lubrication systems, however, typically operate based on a speed of the fan such that the auxiliary lubrication system operates only when the fan speed is below a threshold speed, such as during a shutdown of the turbine engine. Such auxiliary lubrication systems may be unable to operate to supply the lubricant to the one or more rotating components during operation of the turbine engine, for example, when the turbine engine is operating (e.g., the fan speed is greater than the threshold speed), and the primary lubrication system is unable to provide the lubricant to the one or more rotating components. Further, the auxiliary pump requires added complexity to provide the lubricant during high speeds, such as during operation of the turbine engine, and during low speeds, such as during windmilling (e.g., in-flight or on the ground). Further, the auxiliary pump requires added complexity to provide the lubricant while the fan windmills in either direction (e.g., the fan rotates clockwise or counterclockwise).

Accordingly, the present disclosure provides an auxiliary lubrication system that supplies the lubricant to the one or more rotating components during any time that the primary lubrication system is unable to supply the lubricant. The auxiliary lubrication system includes an auxiliary reservoir in fluid communication with the primary reservoir and with the one or more rotating components. The auxiliary reservoir is positioned at substantially a six o'clock position of the turbine engine such that the lubricant drains from the primary reservoir to the auxiliary reservoir via gravity. In some embodiments, the auxiliary lubrication system has an auxiliary lubricant supply line that supplies the lubricant from the auxiliary reservoir to the one or more rotating components. The auxiliary lubricant supply line can be separate from the primary lubricant supply line. In some embodiments, the auxiliary lubricant supply line is in fluid communication with the primary lubricant supply line in series such that the lubricant flows from the auxiliary reservoir through the primary lubrication system to the one or more rotating components.

During a loss of pressure scenario of the lubricant in the primary lubrication system, the auxiliary lubrication system activates to supply the lubricant from the auxiliary reservoir to the one or more rotating components. For example, an auxiliary pump pumps the lubricant from the auxiliary reservoir to the one or more rotating components. The auxiliary pump is positioned within the auxiliary reservoir. The auxiliary pump being positioned within the auxiliary reservoir allows the auxiliary pump to pump the lubricant in the auxiliary reservoir without additional lubricant lines to the auxiliary pump, thereby reducing complexity of the lubrication system. In some embodiments, the auxiliary pump can be positioned outside of the auxiliary reservoir and can be in fluid communication with the auxiliary reservoir via one or more auxiliary lubricant lines. The auxiliary reservoir fills with the lubricant from the primary reservoir during the loss of pressure scenarios in the primary lubrication system (e.g., windmilling of the fan, a shutdown of the turbine engine, or in-flight loss of pressure of the lubricant in the primary lubrication system). For example, the auxiliary lubrication system includes one or more auxiliary drain valves that open to allow the lubricant to drain from the primary reservoir to the auxiliary reservoir. At the same time, the one or more primary drain valves close to prevent the lubricant from draining from the primary reservoir through the primary lubrication system. Accordingly, the present disclosure provides for supplying the lubricant to the one or more rotating components during a shutdown of the turbine engine or other loss of pressure scenarios in the primary lubrication system.

Referring now to the drawings, FIG. 1 is a schematic cross-sectional diagram of a turbine engine 10, taken along a longitudinal centerline axis 12 of the turbine engine 10, according to an embodiment of the present disclosure. As shown in FIG. 1, the turbine engine 10 defines an axial direction A (extending parallel to the longitudinal centerline axis 12 provided for reference) and a radial direction R that is normal to the axial direction A. In the orientation of FIG. 1, portions of the turbine engine 10 above the longitudinal centerline axis 12 are referred to as a top portion 11 and portions of the turbine engine 10 below the longitudinal centerline axis 12 are referred to as a bottom portion 13.

The turbine engine 10 may be viewed with respect to a "clock" orientation having a twelve o'clock position, a three o'clock position, a six o'clock position, and a nine o'clock position when viewed from a forward view of the turbine engine 10. Although not provided with reference numerals, the clock orientation is understood to include all clock positions therebetween. The twelve o'clock position is positioned at a top of the turbine engine 10 (e.g., at the top portion 11), the three o'clock position is positioned ninety degrees (90°) from the twelve o'clock position, the six o'clock position is positioned at a bottom of the turbine engine 10 (e.g., at the bottom portion 13) and is one hundred eighty degrees (180°) from the twelve o'clock position, and the nine o'clock position is positioned ninety degrees (90°) from the six o'clock position.

In general, the turbine engine 10 includes a fan section 14 and a turbo-engine 16 disposed downstream from the fan section 14. The turbo-engine 16 includes, in serial flow relationship, a compressor section 21, a combustion section 26, and a turbine section 27. The turbo-engine 16 depicted is substantially enclosed within an outer casing 18 that is substantially tubular and defines an annular inlet 20. As schematically shown in FIG. 1, the compressor section 21 including a booster or a low pressure (LP) compressor 22 followed downstream by a high pressure (HP) compressor 24. The combustion section 26 is downstream of the compressor section 21. The turbine section 27 is downstream of the combustion section 26 and includes a high pressure (HP) turbine 28 followed downstream by a low pressure (LP) turbine 30. The turbo-engine 16 includes a jet exhaust nozzle section 32 that is downstream of the turbine section 27. The turbo-engine 16 also includes a high pressure (HP) shaft 34 and a low pressure (LP) shaft 36. The HP shaft 34 drivingly connects the HP turbine 28 to the HP compressor 24, and the HP turbine 28, the HP compressor 24, and the HP shaft 34 are together referred to as an HP spool. The HP turbine 28 and the HP compressor 24 rotate in unison through the HP shaft 34. The LP shaft 36 drivingly connects the LP turbine 30 to the LP compressor 22, and the LP turbine 30, the LP compressor 22, and the LP shaft 36 are together referred to as an LP spool. The LP turbine 30 and the LP compressor 22 rotate in unison through the LP shaft 36. The HP shaft 34, the LP shaft 36, or both the HP shaft 34 and the LP shaft 36 are supported by one or more engine bearings that allow the HP shaft 34 or the LP shaft 36 to rotate, as detailed further below. The compressor section 21, the combustion section 26, the turbine section 27, and the jet exhaust nozzle section 32 together define a core air flow path.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. In the case of a variable pitch fan, each fan blade 40 is rotatable relative to the disk 42 about a pitch axis P by virtue of the fan blades 40 being operatively coupled to an actuation member 44 configured to collectively vary the pitch of the fan blades 40 in unison. The fan blades 40, the disk 42, and the actuation member 44 are together rotatable about the longitudinal centerline axis 12 via a fan shaft 45 that is powered by the LP shaft 36 across a power gearbox, also referred to as a gearbox assembly 46. In this way, the fan 38 is drivingly coupled to, and powered by, the turbo-engine 16. The gearbox assembly 46 is shown schematically in FIG. 1. The gearbox assembly 46 is a reduction gearbox assembly including a plurality of gears for adjusting the rotational speed of the fan shaft 45 and, thus, the fan 38 relative to the LP shaft 36 when power is transferred from the LP shaft 36 to the fan shaft 45. The gearbox assembly 46 also includes one or more gearbox bearings for supporting rotation of one or more of the plurality of gears, as detailed further below.

Referring still to the exemplary embodiment of FIG. 1, the disk 42 is covered by a fan hub 48 that is aerodynamically contoured to promote an airflow through the plurality of fan blades 40. In addition, the fan section 14 includes an annular fan casing or a nacelle 50 that circumferentially surrounds the fan 38 and at least a portion of the turbo-engine 16. The nacelle 50 is supported relative to the turbo-engine 16 by a plurality of outlet guide vanes 52 that are circumferentially spaced about the nacelle 50 and the turbo-engine 16. Moreover, a downstream section 54 of the nacelle 50 extends over an outer portion of the turbo-engine 16 to define a bypass airflow passage 56 therebetween.

During operation of the turbine engine 10, a volume of air 58 enters the turbine engine 10 through an inlet 60 of the nacelle 50 or the fan section 14. As the volume of air 58 passes across the fan blades 40, a first portion of air, also referred to as bypass air 62, is directed into the bypass airflow passage 56. At the same time, a second portion of air, also referred to as core air 64, is directed into the upstream section of the core air flow path through the annular inlet 20 of the LP compressor 22. The ratio between the bypass air 62 and the core air 64 is commonly known as a bypass ratio. The pressure of the core air 64 is then increased through the LP compressor 22, generating compressed air 65. The compressed air 65 is routed through the HP compressor 24, where the pressure of the compressed air 65 is further increased. The compressed air 65 is then directed into the combustion section 26, where the compressed air 65 is mixed with fuel and ignited to generate combustion gases 66.

The combustion gases 66 are routed into the HP turbine 28 and expanded through the HP turbine 28 where a portion of thermal energy or kinetic energy from the combustion gases 66 is extracted via one or more stages of HP turbine stator vanes 68 that are coupled to the outer casing 18 and HP turbine rotor blades 70 that are coupled to the HP shaft 34. This causes the HP shaft 34 to rotate, thereby supporting operation of the HP compressor 24 (self-sustaining cycle). In this way, the combustion gases 66 do work on the HP turbine 28. The combustion gases 66 are then routed into the LP turbine 30 and expanded through the LP turbine 30. Here, a second portion of the thermal energy or kinetic energy is extracted from the combustion gases 66 via one or more stages of LP turbine stator vanes 72 that are coupled to the outer casing 18 and LP turbine rotor blades 74 that are coupled to the LP shaft 36. This causes the LP shaft 36 to rotate, thereby supporting operation of the LP compressor 22 (self-sustaining cycle) and rotation of the fan 38 via the gearbox assembly 46. In this way, the combustion gases 66 do work on the LP turbine 30.

The combustion gases 66 are subsequently routed through the jet exhaust nozzle section 32 of the turbo-engine 16 to provide propulsive thrust. Simultaneously, the bypass air 62 is directed through the bypass airflow passage 56 before being exhausted from a fan nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the turbo-engine 16.

A controller 102 is in communication with the turbine engine 10 for controlling aspects of the turbine engine 10. For example, the controller 102 is in two-way communication with the turbine engine 10 for receiving signals from various sensors and control systems of the turbine engine 10 and for controlling components of the turbine engine 10, as detailed further below. The controller 102, or components thereof, may be located onboard the turbine engine 10, onboard the aircraft (not shown), or can be located remote from each of the turbine engine 10 and the aircraft. The controller 102 can be a Full Authority Digital Engine Control (FADEC) that controls aspects of the turbine engine 10.

The controller 102 may be a standalone controller or may be part of an engine controller to operate various systems of the turbine engine 10. In this embodiment, the controller 102 is a computing device having one or more processors and a memory. The one or more processors can be any suitable processing device, including, but not limited to, a microprocessor, a microcontroller, an integrated circuit, a logic device, a programmable logic controller (PLC), an application specific integrated circuit (ASIC), or a Field Programmable Gate Array (FPGA). The memory can include one or more computer-readable media, including, but not limited to, non-transitory computer-readable media, a computer readable non-volatile medium (e.g., a flash memory), a RAM, a ROM, hard drives, flash drives, or other memory devices.

The memory can store information accessible by the one or more processors, including computer-readable instructions that can be executed by the one or more processors. The instructions can be any set of instructions or a sequence of instructions that, when executed by the one or more processors, cause the one or more processors and the controller 102 to perform operations. The controller 102 and, more specifically, the one or more processors are programmed or configured to perform these operations, such as the operations discussed further below. In some embodiments, the instructions can be executed by the one or more processors to cause the one or more processors to complete any of the operations and functions for which the controller 102 is configured, as will be described further below. The instructions can be software written in any suitable programming language or can be implemented in hardware. Additionally, or alternatively, the instructions can be executed in logically or virtually separate threads on the processors. The memory can further store data that can be accessed by the one or more processors.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, turbojet engines, turboprop, or turboshaft engines.

Figure 2:
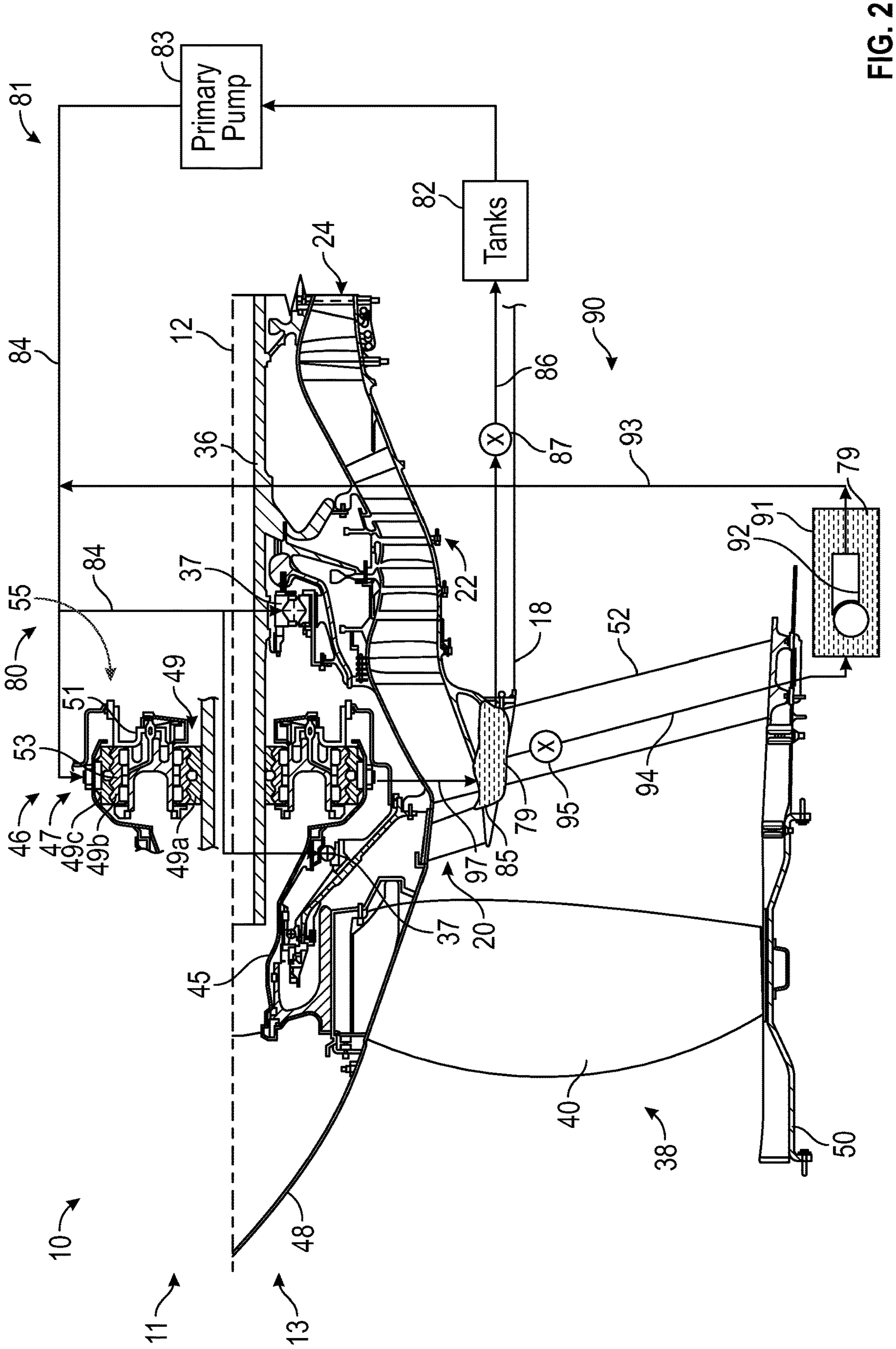
FIG. 2 is a detailed schematic cross-sectional view of a portion of the turbine engine of FIG. 1, taken at detail 2 in FIG. 1, according to the present disclosure.

FIG. 2 is a detailed schematic cross-sectional view of a portion of the turbine engine 10, taken at detail 2 in FIG. 1, according to the present disclosure. As shown in FIG. 2, the turbine engine 10 includes one or more engine bearings 37 that support rotation of the LP shaft 36 and the fan shaft 45. The one or more engine bearings 37 can also support rotation of the HP shaft 34 (FIG. 1). The one or more engine bearings 37 can include any number of engine bearings 37 for supporting rotation of the shafts of the turbine engine 10. The one or more engine bearings 37 are referred to as rotating components of the turbine engine 10, and can include any type of bearing, such as, for example, journal bearings, roller bearings, or the like.

The gearbox assembly 46 includes a gear assembly 47 having a plurality of gears 49. The plurality of gears 49 includes a first gear **49*a*, one or more second gears 49*b* secured by a planet carrier 51, and a third gear 49*c*. In FIG. 2, the first gear 49*a* is a sun gear, the one or more second gears 49*b* are planet gears, and the third gear 49*c* is a ring gear. The gear assembly 47 can be an epicyclic gear assembly. When the gear assembly 47 is an epicyclic gear assembly, the one or more second gears 49*b* include a plurality of second gears 49*b* (e.g., two or more second gears 49*b***).

In the epicyclic gear assembly, the gear assembly 47 can be in a star arrangement or a rotating ring gear type gear assembly (e.g., the third gear **49*c* is rotating and the planet carrier 51 is fixed and stationary). In such an arrangement, the fan 38 is driven by the third gear 49*c*. For example, the third gear 49*c* is coupled to the fan shaft 45 such that rotation of the third gear 49*c* causes the fan shaft 45, and, thus, the fan 38, to rotate. In this way, the third gear 49*c* is an output of the gear assembly 47. However, other suitable types of gear assemblies may be employed. In one non-limiting embodiment, the gear assembly 47 is a planetary arrangement, in which the third gear 49***c* is held fixed, with the planet carrier 51 allowed to rotate. In such an arrangement, the fan 38 is driven by the planet carrier 51. For example, the planet carrier 51 is coupled to the fan shaft 45 such that rotation of the planet carrier 51 causes the fan shaft 45, and, thus, the fan 38, to rotate. In this way, the one or more second gears 49*b* (e.g., via the planet carrier 51) are the output of the gear assembly 47. In another non-limiting embodiment, the gear assembly 47 may be a differential gear assembly in which the third gear 49*c* and the planet carrier 51 are both allowed to rotate. While an epicyclic gear assembly is detailed herein, the gear assembly can include any type of gear assembly including, for example, a compound gear assembly, a multiple stage gear assembly, a gear assembly for driving a propeller, a gear assembly for driving accessories of the turbine engine 10 or accessories of the aircraft, or the like.

The plurality of gears 49 includes one or more gear bearings 53 disposed therein. For example, the one or more second gears 49*b* each includes one or more gear bearings 53 disposed therein. The one or more gear bearings 53 enable the plurality of gears 49 to rotate about the one or more gear bearings 53 such that the plurality of gears 49 rotates. The one or more gear bearings 53 can include any type of bearing for a gear, such as, for example, journal bearings, roller bearings, or the like. The plurality of gears 49 and the one or more gear bearings 53 are rotating components of the turbine engine 10. Accordingly, the turbine engine 10 includes one or more rotating components 55 that includes at least one of the one or more engine bearings 37, the plurality of gears 49, or the one or more gear bearings 53.

The first gear 49*a* is coupled to an input shaft of the turbine engine 10. For example, the first gear 49*a* is coupled to the LP shaft 36 such that rotation of the LP shaft 36 causes the first gear 49*a* to rotate. Radially outward of the first gear 49*a*, and intermeshing therewith, is the one or more second gears 49*b* that are coupled together and supported by the planet carrier 51. The planet carrier 51 supports and constrains the one or more second gears 49*b* such that the each of the one or more second gears 49*b* is enabled to rotate about a corresponding axis of each second gear 49*b* without rotating about the periphery of the first gear 49*a*. Radially outwardly of the one or more second gears 49*b*, and intermeshing therewith, is the third gear 49*c*, which is an annular ring gear. The third gear 49*c* is coupled via an output shaft to the fan 38 and rotates to drive rotation of the fan 38 about the longitudinal centerline axis 12. For example, the fan shaft 45 is coupled to the third gear 49*c*.

The turbine engine 10 includes a lubrication system 80 including a primary lubrication system 81 and an auxiliary lubrication system 90. The lubrication system 80 includes one or more tanks 82 that store a lubricant 79 therein. The primary lubrication system 81 includes a primary pump 83 and a primary lubricant supply line 84. Preferably, the lubricant 79 is oil. The lubricant 79 can be any type of lubricant for lubricating the one or more rotating components 55 of the turbine engine 10, such as, for example, the plurality of gears 49, the one or more gear bearings 53, or the one or more engine bearings 37. The primary pump 83 is in fluid communication with the one or more tanks 82 and the primary lubricant supply line 84. The primary lubricant supply line 84 is in fluid communication with the one or more rotating components 55. The primary pump 83 pumps the lubricant 79 from the one or more tanks 82 to the one or more rotating components 55 through the primary lubricant supply line 84 for supplying the lubricant 79 to the one or more rotating components 55, as detailed further below. In some embodiments, the lubrication system 80 supplies the lubricant 79 from the one or more tanks 82 to the one or more rotating components 55 without a pump, for example, by gravity or by centrifugal force due to rotation of the planet carrier 51 in the planetary arrangement of the gear assembly 47.

The lubrication system 80 includes a primary reservoir 85 within the turbine engine 10 and in fluid communication with the one or more rotating components 55. In one embodiment, the primary reservoir 85 is located within the outer casing 18 in the bottom portion 13 of the turbine engine 10. In some embodiments, the primary reservoir 85 is located within one or more of the plurality of outlet guide vanes 52 that are positioned on the bottom portion 13 of the turbine engine 10. The primary reservoir 85 is a reservoir that collects and stores the lubricant 79 that drains from the one or more rotating components 55. For example, the lubricant 79 drains from the one or more rotating components 55 into the primary reservoir 85 via gravity. The primary reservoir 85 is also referred to as a sump.

The primary reservoir 85 includes a primary lubricant return line 86 for draining the lubricant 79 from the primary reservoir 85. The primary lubricant return line 86, also referred to as a scavenge line, is in fluid communication with the primary reservoir 85 and with the one or more tanks 82. In this way, the lubricant 79 drains from the primary reservoir 85 and the primary lubricant return line 86 operably directs the lubricant 79 to the one or more tanks 82. In some embodiments, the primary reservoir 85 embodies one of the one or more tanks 82. In some embodiments, the lubrication system 80 includes a sump pump in fluid communication with the primary reservoir 85 and the primary lubricant return line 86. The sump pump pumps the lubricant 79 and pumps air within the primary reservoir 85 or the primary lubricant return line 86 that has leaked into the primary reservoir 85 during operation of the turbine engine 10. The sump pump is a suction pump that generates suction to pull the lubricant 79 or the air through the primary lubricant return line 86 and towards the one or more tanks 82.

The primary lubricant return line 86 also includes one or more primary drain valves 87 within the primary lubricant return line 86. The one or more primary drain valves 87 are controlled to be opened and to be closed. When the one or more primary drain valves 87 are open, the lubricant 79 flows from the primary reservoir 85 through the primary lubricant return line 86 and into the one or more tanks 82, as detailed further below. When the one or more primary drain valves 87 are closed, the one or more primary drain valves 87 prevent the lubricant 79 from flowing from the primary reservoir 85 and into the primary lubricant return line 86, as detailed further below. The one or more primary drain valves 87 can include any type of valve that opens to allow the lubricant 79 to flow through the primary lubricant return line 86 and that closes to prevent the lubricant 79 from flowing through the primary lubricant return line 86. In some embodiments, the one or more primary drain valves 87 are in communication with the controller 102 (FIG. 1). The controller 102 controls the one or more primary drain valves 87 to open and to close the one or more primary drain valves 87. In some embodiments, the one or more primary drain valves 87 are in fluid communication with the primary lubrication system 81 via a primary pressure signal line that provides an indication of the pressure in the primary lubrication system 81 (e.g., in the primary lubricant supply line

84). The one or more primary drain valves 87 open when the pressure in the primary lubrication system 81 is greater than a pressure threshold and close when the pressure in the primary lubrication system 81 is less than the pressure threshold.

The auxiliary lubrication system 90 includes an auxiliary reservoir 91, an auxiliary pump 92, an auxiliary lubricant supply line 93, an auxiliary lubricant return line 94, and one or more auxiliary drain valves 95. The auxiliary reservoir 91 stores the lubricant 79 therein. The auxiliary reservoir 91 is positioned substantially at the six o'clock position of the turbine engine 10 such that the lubricant 79 drains into the auxiliary reservoir 91 via gravity, as detailed further below. For example, the auxiliary reservoir 91 is positioned within the nacelle 50 in the bottom portion 13 of the turbine engine 10. In some embodiments, the auxiliary reservoir 91 is positioned within a strut, such as, for example, one of the plurality of outlet guide vanes 52. The auxiliary lubricant supply line 93 is in fluid communication with the auxiliary reservoir 91 and the one or more rotating components 55. While the auxiliary lubricant supply line 93 is depicted as a separate flow line as the primary lubricant supply line 84 in FIG. 2, the auxiliary lubricant supply line 93 can form a part of the primary lubricant supply line 84. The auxiliary pump 92 is disposed within the auxiliary reservoir 91 and is in fluid communication with the auxiliary lubricant supply line 93. The auxiliary pump 92 can be powered by mechanical power, hydraulic power, electromagnetic power, or electrical power. The power for the auxiliary pump 92 can be generated by rotation of the LP shaft 36. In some embodiments, a battery powers the auxiliary pump 92. The auxiliary pump 92 can be powered by any power source as long as the power source is capable of providing power to the auxiliary pump 92 while the turbine engine 10 is shut down and while the fan 38 is windmilling.

The auxiliary lubricant return line 94 is in fluid communication with the primary reservoir 85 and the auxiliary reservoir 91. In this way, the lubricant 79 flows from the primary reservoir 85 to the auxiliary reservoir 91 through the auxiliary lubricant return line 94, as detailed further below. The one or more auxiliary drain valves 95 are in fluid communication with the auxiliary lubricant return line 94 and are controlled to be opened and to be closed. When the one or more auxiliary drain valves 95 are open, the lubricant 79 flows from the primary reservoir 85 through the auxiliary lubricant return line 94 and into the auxiliary reservoir 91, as detailed further below. When the one or more auxiliary drain valves 95 are closed, the one or more auxiliary drain valves 95 prevent the lubricant 79 from flowing from the primary reservoir 85, into the auxiliary lubricant return line 94, and into the auxiliary reservoir 91, as detailed further below. The one or more auxiliary drain valves 95 can include any type of valve that opens to allow the lubricant 79 to flow through the auxiliary lubricant return line 94 and that closes to prevent the lubricant 79 from flowing through the auxiliary lubricant return line 94. In some embodiments, the one or more auxiliary drain valves 95 are in communication with the controller 102 (FIG. 1). The controller 102 controls the one or more auxiliary drain valves 95 to open and to close the one or more auxiliary drain valves 95. In some embodiments, the one or more auxiliary drain valves 95 are in fluid communication with the primary lubrication system 81 and are controlled to be opened or to be closed based on a pressure signal of the lubricant 79 (e.g., from a primary pressure signal line) in the primary lubrication system 81 (e.g., in the primary lubricant supply line 84).

In operation, the LP shaft 36 rotates, as detailed above, and causes the first gear 49*a* to rotate. The first gear 49*a*, being intermeshed with the one or more second gears 49*b*, causes the one or more second gears 49*b* to rotate about their corresponding axis of rotation. The one or more second gears 49*b* rotate with respect to the one or more gear bearings 53 within the planet carrier 51. When the gear assembly 47 is the star arrangement, the one or more second gears 49*b*, being intermeshed with the third gear 49*c*, cause the third gear 49*c* to rotate about the longitudinal centerline axis 12. In such embodiments, the planet carrier 51 remains stationary such that the one or more second gears 49*b* do not rotate about the longitudinal centerline axis 12. When the gear assembly 47 is the planetary arrangement, the third gear 49*c* is stationary within the planet carrier 51, and the one or more second gears 49*b*, rotate about the longitudinal centerline axis 12. When the gear assembly 47 is the differential gear assembly, both the planet carrier 51 (e.g., the one or more second gears 49*b*) and the third gear 49*c* rotate about the longitudinal centerline axis 12.

At the same time, the one or more engine bearings 37 rotate to allow rotation of the LP shaft 36, the fan shaft 45, or the HP shaft 34 (FIG. 1). In this way, the one or more rotating components 55 rotate. As the rotating components 55 rotate, the primary lubrication system 81 supplies the lubricant 79 to the one or more rotating components 55 to lubricate the one or more rotating components 55. During normal operation of the turbine engine 10, the primary pump 83 pumps the lubricant 79 from the one or more tanks 82 (e.g., from the primary reservoir 85) and to the one or more rotating components 55 through the primary lubricant supply line 84. The primary lubrication system 81 supplies the lubricant 79 to the one or more rotating components 55.

The lubricant 79 drains from the one or more rotating components 55 and into the primary reservoir 85 (as indicated by arrow 97). During the normal operation of the turbine engine 10, the lubricant 79 in the primary reservoir 85 is drained from the primary reservoir 85 through the primary lubricant return line 86. For example, the one or more primary drain valves 87 are opened during the normal operation of the turbine engine 10, and the primary pump 83 (or the sump pump or a scavenge pump) pumps the lubricant 79 from the primary reservoir 85 through the primary lubricant return line 86 and re-circulates the lubricant 79 through the primary lubrication system 81 (e.g., through the primary lubricant supply line 84) and the rotating components 55. In this way, the lubricant 79 can be re-used to lubricate the one or more rotating components 55.

In some instances, the primary lubrication system 81 may be unable to provide the lubricant 79 to the one or more rotating components 55. For example, the primary lubrication system 81 may be unable to pressurize the lubricant 79 to supply the lubricant 79 to the one or more rotating components 55 during windmilling, while the turbine engine 10 is shut down, or during a failure of the turbine engine 10 or the primary lubrication system 81 (e.g., the primary pump 83) fails while in-flight. In such instances, the windmilling may cause the shafts (e.g., the fan shaft 45, the HP shaft 34, and the LP shaft 36) of the turbine engine 10 to rotate, thereby causing the one or more rotating components 55 to rotate. The one or more rotating components 55 (e.g., the one or more engine bearings 37, the plurality of gears 49, or the one or more gear bearings 53) can become damaged if there is not enough lubricant 79 supplied to the one or more rotating components 55.

Accordingly, during such instances, the auxiliary lubrication system 90 activates to supply the lubricant 79 to the one or more rotating components 55. For example, the one or more primary drain valves 87 close and the one or more auxiliary drain valves 95 open such that the lubricant 79 drains from the primary reservoir 85 through the auxiliary lubricant return line 94 and fills the auxiliary reservoir 91. The auxiliary pump 92 pumps the lubricant 79 from the auxiliary reservoir 91 to the one or more rotating components 55 through the auxiliary lubricant supply line 93. In this way, the auxiliary lubrication system 90 supplies the lubricant 79 to the one or more rotating components 55 when the primary lubrication system 81 is unable to supply the lubricant 79 to the one or more rotating components 55.

The one or more primary drain valves 87 and the one or more auxiliary drain valves 95 are controlled by at least one of a pressure of the lubricant 79 in the primary lubrication system 81, a pressure of fuel in the turbine engine 10, or a pressure of hydraulics of the turbine engine 10 (e.g., hydraulics for controlling control surfaces of the aircraft). For example, the one or more primary drain valves 87 open and the one or more auxiliary drain valves 95 close when the at least one of the pressure of the lubricant 79 in the primary lubrication system 81, the pressure of the fuel in the turbine engine 10, or the pressure of the hydraulics of the turbine engine 10 is greater than the pressure threshold. The pressure threshold is determined based on an operating speed of the turbine engine 10 (e.g., a speed of the turbo-engine 16 or a speed of the fan 38). The one or more primary drain valves 87 close and the one or more auxiliary drain valves 95 open when the at least one of the pressure of the lubricant 79 in the primary lubrication system 81, the pressure of the fuel in the turbine engine 10, or the pressure of the hydraulics of the turbine engine 10 is less than the pressure threshold.

In some embodiments, the at least one of the pressure of the lubricant 79 in the primary lubrication system 81, the pressure of the fuel in the turbine engine 10, or the pressure of the hydraulics of the turbine engine 10 is based on a speed of the turbo-engine 16. For example, when a speed of the turbo-engine 16 (e.g., a rotational speed of the HP shaft 34 or the LP shaft 36) is greater than a speed threshold, the at least one of the pressure of the lubricant 79 in the primary lubrication system 81, the pressure of the fuel in the turbine engine 10, or the pressure of the hydraulics of the turbine engine 10 is greater than the pressure threshold. Similarly, when the speed of the turbo-engine 16 is less than the speed threshold, the at least one of the pressure of the lubricant 79 in the primary lubrication system 81, the pressure of the fuel in the turbine engine 10, or the pressure of the hydraulics of the turbine engine 10 is less than the pressure threshold. In some embodiments, the speed threshold of the turbo-engine 16 is at least 5% of a maximum speed of the turbo-engine 16. In some embodiments, the speed threshold of the turbo-engine 16 is approximately 5% to approximately 10% of the maximum speed of the turbo-engine 16. The speed threshold can include any value up to the maximum speed of the turbo-engine 16 for determining when to open the one or more primary drain valves 87 and to close the one or more auxiliary drain valves 95.

In such embodiments, the one or more primary drain valves 87 and the one or more auxiliary drain valves 95 are electrically energized valves, such as, for example, a solenoid valve. In some embodiments, the one or more primary drain valves 87 open and the one or more auxiliary drain valves 95 close when the controller 102 turns on, and the one or more primary drain valves 87 close and the one or more auxiliary drain valves 95 open when the controller 102 turns off (e.g., during a shutdown of the turbine engine 10). The controller 102 turns on when the speed of the turbo-engine 16 is greater than the speed threshold. The turbine engine 10 provides power to the controller 102 to turn the controller 102 on when the speed of the turbo-engine 16 is greater than the speed threshold. The controller 102 turns off when the speed of the turbo-engine 16 is less than the speed threshold.

Figure 3:
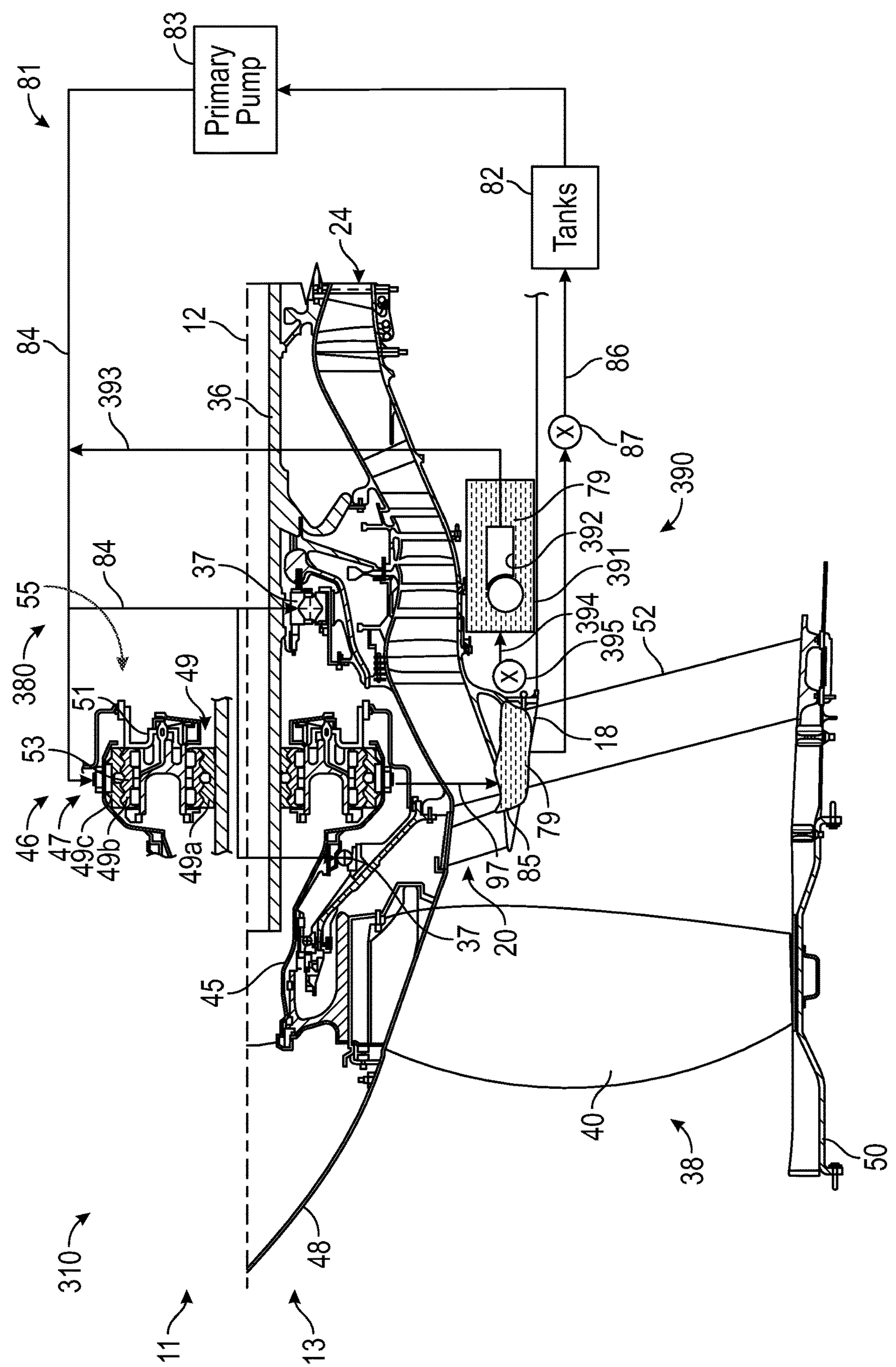
FIG. 3 is a detailed schematic cross-sectional view of a portion of a turbine engine, taken along the longitudinal centerline axis of the turbine engine, according to another aspect of the present disclosure.

FIG. 3 is a detailed schematic cross-sectional view of a portion of a turbine engine 310, taken at the longitudinal centerline axis 12 of the turbine engine 310, according to another embodiment. The turbine engine 310 is substantially similar as the turbine engine 10 of FIGS. 1 and 2. The turbine engine 310 includes a lubrication system 380 including the primary lubrication system 81 and an auxiliary lubrication system 390. The auxiliary lubrication system 390 includes an auxiliary reservoir 391, an auxiliary pump 392, an auxiliary lubricant supply line 393, an auxiliary lubricant return line 394, and one or more auxiliary drain valves 395. The auxiliary reservoir 391 is positioned within the outer casing 18 of the turbo-engine 16. For example, the auxiliary reservoir 391 is positioned in the bottom portion 13 of the outer casing 18. The turbine engine 310 and the lubrication system 380 operate substantially similar as to the turbine engine 10 and the lubrication system 80 of FIGS. 1 and 2, respectively.

Accordingly, the present disclosure provides for supplying the lubricant 79 to the one or more rotating components 55 during a shutdown of the turbine engines 10, 310 or other loss of pressure scenarios (e.g., while the turbine engines 10, 310 are operating). The lubrication systems 80, 380 herein supply the lubricant 79 during windmilling and loss of pressure scenarios regardless of a rotational direction of the fan 38. For example, the auxiliary lubrication systems 90, 390 supply the lubricant 79 to the one or more rotating components 55 whether the fan 38 is rotating in a first rotational direction or in a second rotational direction that is opposite the first rotational direction. In some embodiments, the auxiliary lubrication systems 90, 390 operate passively, for example, based on the pressure of the lubricant 79 from the primary pressure signal line, and operate independently of the controller 102. In this way, the auxiliary lubrication systems 90, 390 can operate even if there is a controller failure.

Further aspects of the present disclosure are provided by the subject matter of the following clauses.

A lubrication system for a turbine engine having one or more rotating components. The lubrication system comprises a primary reservoir that stores a lubricant therein, a primary lubrication system supplying the lubricant from the primary reservoir to the one or more rotating components during normal operation of the turbine engine, and an auxiliary lubrication system comprising an auxiliary reservoir in fluid communication with the primary reservoir and the one or more rotating components and receiving the lubricant from the primary reservoir, the auxiliary reservoir positioned at substantially a six o'clock position of the turbine engine, and the auxiliary lubrication system supplying the lubricant from the auxiliary reservoir to the one or more rotating components based on at least one of a pressure of the lubricant in the primary lubrication system, a pressure of fuel in the turbine engine, or a pressure of hydraulics of the turbine engine.

The lubrication system of the preceding clause, the turbine engine further comprising an outer casing, and the primary reservoir being positioned within the outer casing.

The lubrication system of any preceding clause, the auxiliary reservoir being positioned within the outer casing.

The lubrication system of any preceding clause, the turbine engine further comprising a nacelle, and the auxiliary reservoir being positioned within the nacelle.

The lubrication system of any preceding clause, the auxiliary reservoir being positioned in a bottom portion of the turbine engine.

The lubrication system of any preceding clause, the turbine engine comprising a fan having a fan shaft.

The lubrication system of any preceding clause, the turbine engine comprising a gear assembly including a plurality of gears and one or more gear bearings, the one or more rotating components including at least one of the plurality of gears and the one or more gear bearings.

The lubrication system of any preceding clause, the turbine engine comprising one or more shafts and one or more engine bearings that support rotation of the one or more shafts, the one or more rotating components including the one or more engine bearings.

The lubrication system of any preceding clause, the auxiliary lubrication system further comprising an auxiliary pump that pumps the lubricant from the auxiliary reservoir to the one or more rotating components.

The lubrication system of any preceding clause, the auxiliary pump being positioned within the auxiliary reservoir.

The lubrication system of any preceding clause, the auxiliary lubrication system further comprising an auxiliary lubricant supply line in fluid communication with the auxiliary reservoir and the one or more rotating components, the auxiliary lubrication system supplying the lubricant from the auxiliary reservoir to the one or more rotating components through the auxiliary lubricant supply line.

The lubrication system of any preceding clause, the primary lubrication system further comprising a primary lubricant supply line in fluid communication with the primary reservoir and the one or more rotating components, the primary lubrication system supplying the lubricant from the primary reservoir to the one or more rotating components through the primary lubricant supply line.

The lubrication system of any preceding clause, the auxiliary lubricant supply line being fluidly separate from the primary lubricant supply line.

The lubrication system of any preceding clause, the auxiliary lubricant supply line being in fluid communication with the primary lubricant supply line such that the auxiliary lubrication system supplies the lubricant from the auxiliary reservoir to the one or more rotating components through the primary lubricant supply line.

The lubrication system of any preceding clause, the primary lubrication system further comprising a primary pump that pumps the lubricant from the primary reservoir to the one or more rotating components.

The lubrication system of any preceding clause, the primary lubrication system further comprising one or more tanks that store the lubricant therein.

The lubrication system of any preceding clause, the primary lubrication system supplying the lubricant to the one or more rotating components when the pressure of the lubricant in the primary lubrication system is greater than a pressure threshold.

The lubrication system of any preceding clause, the primary lubrication system being prevented from supplying the lubricant to the one or more rotating components when the pressure of the lubricant in the primary lubrication system is less than the pressure threshold.

The lubrication system of any preceding clause, the primary lubrication system further comprising a primary lubricant return line in fluid communication with the primary reservoir and the one or more tanks such that the lubricant flows from the primary reservoir to the one or more tanks through the primary lubricant supply line during normal operation of the turbine engine.

The lubrication system of any preceding clause, the primary lubrication system further comprising one or more primary drain valves that open to allow the lubricant to flow from the primary reservoir through the primary lubrication system during the normal operation of the turbine engine.

The lubrication system of any preceding clause, the one or more primary drain valves closing to prevent the lubricant from flowing through the primary lubrication system when the pressure of the lubricant in the primary lubrication system is less than the pressure threshold.

The lubrication system of any preceding clause, the one or more primary drain valves opening to allow the lubricant to flow through the primary lubrication system when the pressure of the lubricant in the primary lubrication system is greater than the pressure threshold.

The lubrication system of any preceding clause, the lubricant being supplied to a top portion of the one or more rotating components.

The lubrication system of any preceding clause, the auxiliary lubrication system supplying the lubricant to the one or more rotating components when the pressure of the lubricant in the primary lubrication system is less than the pressure threshold.

The lubrication system of any preceding clause, the auxiliary lubrication system being prevented from supplying the lubricant to the one or more rotating components when the pressure of the lubricant in the primary lubrication system is greater than the pressure threshold.

The lubrication system of any preceding clause, the auxiliary lubrication system comprising an auxiliary lubricant return line in fluid communication with the primary reservoir and the auxiliary reservoir such that the lubricant flows from the primary reservoir to the auxiliary reservoir through the auxiliary lubricant return line.

The lubrication system of any preceding clause, the auxiliary lubrication system comprising one or more auxiliary drain valves that open to allow the lubricant to flow from the primary reservoir to the auxiliary reservoir, and that close to prevent the lubricant from flowing to the auxiliary reservoir.

The lubrication system of any preceding clause, the one or more auxiliary drain valves opening when the pressure of the lubricant in the primary lubrication system is less than the pressure threshold.

The lubrication system of any preceding clause, the one or more auxiliary drain valves closing when the pressure of the lubricant in the primary lubrication system is greater than the pressure threshold.

The lubrication system of any preceding clause, further comprising a controller that controls the one or more primary drain valves to open or to close the one or more primary drain valves.

The lubrication system of any preceding clause, the controller controlling the one or more auxiliary drain valves to open or to close the one or more auxiliary drain valves.

The lubrication system of any preceding clause, the auxiliary lubrication system supplying the lubricant from the auxiliary reservoir to the one or more rotating components based on at least one of the pressure of the lubricant in the primary lubrication system, a pressure of fuel in the turbine engine, or a pressure of hydraulics of the turbine engine.

The lubrication system of any preceding clause, the auxiliary lubrication system supplying the lubricant from the auxiliary reservoir to the one or more rotating components when the at least one of the pressure of the lubricant in the primary lubrication system, the pressure of the fuel in the turbine engine, or the pressure of the hydraulics of the turbine engine is less than a pressure threshold.

A turbine engine comprising a fan, a turbo-engine, and a lubrication system. The fan is drivingly coupled to the turbo-engine. The turbine engine comprises an outer casing that surrounds the turbo-engine and one or more rotating components. The lubrication system is the lubrication system of any preceding clause and the primary reservoir is positioned in the outer casing.

A method of operating the lubrication system of any preceding clause, the method comprising supplying the lubricant from the primary reservoir through the primary lubrication system to the one or more rotating components during normal operation of the turbine engine, draining the lubricant from the primary reservoir to the auxiliary reservoir, and supplying the lubricant from the auxiliary reservoir through the auxiliary lubrication system to the one or more rotating components based on at least one of a pressure of the lubricant in the primary lubrication system, a pressure of fuel in the turbine engine, or a pressure of hydraulics of the turbine engine The method of the preceding clause, the turbine engine further comprising an outer casing, and the primary reservoir being positioned with the outer casing.

The method of any preceding clause, the auxiliary reservoir being positioned within the outer casing.

The method of any preceding clause, the turbine engine further comprising a nacelle, and the auxiliary reservoir being positioned within the nacelle.

The method of any preceding clause, the auxiliary reservoir being positioned in a bottom portion of the turbine engine.

The method of any preceding clause, the turbine engine comprising a fan having a fan shaft.

The method of any preceding clause, the turbine engine comprising a gear assembly including a plurality of gears and one or more gear bearings, the one or more rotating components including at least one of the plurality of gears and the one or more gear bearings.

The method of any preceding clause, the turbine engine comprising one or more shafts and one or more engine bearings that support rotation of the one or more shafts, the one or more rotating components including the one or more engine bearings.

The method of any preceding clause, the auxiliary lubrication system further comprising an auxiliary pump, and the method further comprising pumping, with the auxiliary pump, the lubricant from the auxiliary reservoir to the one or more rotating components.

The method of any preceding clause, the auxiliary pump being positioned within the auxiliary reservoir.

The method of any preceding clause, the auxiliary lubrication system further comprising an auxiliary lubricant supply line in fluid communication with the auxiliary reservoir and the one or more rotating components, the method further comprising supplying the lubricant from the auxiliary reservoir to the one or more rotating components through the auxiliary lubricant supply line.

The method of any preceding clause, the primary lubrication system further comprising a primary lubricant supply line in fluid communication with the primary reservoir and the one or more rotating components, the method comprising supplying the lubricant from the primary reservoir to the one or more rotating components through the primary lubricant supply line.

The method of any preceding clause, the auxiliary lubricant supply line being fluidly separate from the primary lubricant supply line.

The method of any preceding clause, the auxiliary lubricant supply line being in fluid communication with the primary lubricant supply line, and the method further comprising supplying the lubricant from the auxiliary reservoir to the one or more rotating components through the primary lubricant supply line.

The method of any preceding clause, the primary lubrication system further comprising a primary pump, and the method further comprising pumping, with the primary pump, the lubricant from the primary reservoir to the one or more rotating components.

The method of any preceding clause, the primary lubrication system further comprising one or more tanks that store the lubricant therein, and the method further comprising supplying the lubricant from the one or more tanks to the one or more rotating components.

The method of any preceding clause, further comprising supplying the lubricant to the one or more rotating components through the primary lubrication system when the pressure of the lubricant in the primary lubrication system is greater than a pressure threshold.

The method of any preceding clause, further comprising preventing the primary lubrication system from supplying the lubricant to the one or more rotating components when the pressure of the lubricant in the primary lubrication system is less than the pressure threshold.

The method of any preceding clause, the primary lubrication system further comprising a primary lubricant return line in fluid communication with the primary reservoir and the one or more tanks, and the method further comprising directing the lubricant from the primary reservoir to the one or more tanks through the primary lubricant supply line during normal operation of the turbine engine.

The method of any preceding clause, the primary lubrication system further comprising one or more primary drain valves, and the method further comprising opening the one or more primary drain valves to allow the lubricant to flow from the primary reservoir through the primary lubrication system during the normal operation of the turbine engine.

The method of any preceding clause, further comprising closing the one or more primary drain valves to prevent the lubricant from flowing through the primary lubrication system when the pressure of the lubricant in the primary lubrication system is less than the pressure threshold.

The method of any preceding clause, further comprising opening the one or more primary drain valves to allow the lubricant to flow through the primary lubrication system when the pressure of the lubricant in the primary lubrication system is greater than the pressure threshold.

The method of any preceding clause, further comprising supplying the lubricant to a top portion of the one or more rotating components.

The method of any preceding clause, further comprising supplying the lubricant to the one or more rotating components from the auxiliary reservoir when the pressure of the lubricant in the primary lubrication system is less than the pressure threshold.

The method of any preceding clause, further comprising preventing the auxiliary lubrication system from supplying the lubricant to the one or more rotating components when the pressure of the lubricant in the primary lubrication system is greater than the pressure threshold.

The method of any preceding clause, the auxiliary lubrication system comprising an auxiliary lubricant return line in fluid communication with the primary reservoir and the auxiliary reservoir, and the method further comprising directing the lubricant from the primary reservoir to the auxiliary reservoir through the auxiliary lubricant return line.

The method of any preceding clause, the auxiliary lubrication system comprising one or more auxiliary drain valves, and the method further comprising opening the one or more auxiliary drain valves to allow the lubricant to flow from the primary reservoir to the auxiliary reservoir, and that close to prevent the lubricant from flowing to the auxiliary reservoir.

The method of any preceding clause, further comprising opening the one or more auxiliary drain valves when the pressure of the lubricant in the primary lubrication system is less than the pressure threshold.

The method of any preceding clause, further comprising closing the one or more auxiliary drain valves when the pressure of the lubricant in the primary lubrication system is greater than the pressure threshold.

The method of any preceding clause, the turbine engine further comprising a controller, and the method further comprising controlling, with the controller, the one or more primary drain valves to open or to close the one or more primary drain valves.

The method of any preceding clause, further comprising controlling, with the controller, the one or more auxiliary drain valves to open or to close the one or more auxiliary drain valves.

The method of any preceding clause, further comprising supplying the lubricant from the auxiliary reservoir to the one or more rotating components when the least one of the pressure of the lubricant in the primary lubrication system, the pressure of the fuel in the turbine engine, or the pressure of the hydraulics of the turbine engine is less than a pressure threshold.

The method of any preceding clause, further comprising supplying the lubricant from the auxiliary reservoir to the one or more rotating components when the at least one of the pressure of the lubricant in the primary lubrication system, the pressure of the fuel in the turbine engine, or the pressure of the hydraulics of the turbine engine is less than a pressure threshold.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A lubrication system for a turbine engine having one or more rotating components, the lubrication system comprising:

- a primary reservoir that stores a lubricant therein;
- a primary lubrication system supplying the lubricant from the primary reservoir to the one or more rotating components during normal operation of the turbine engine; and
- an auxiliary lubrication system comprising:
  - an auxiliary reservoir in fluid communication with the primary reservoir and the one or more rotating components and receiving the lubricant from the primary reservoir, the auxiliary reservoir positioned at substantially a six o'clock position of the turbine engine; and
- one or more auxiliary drain valves that open to allow the lubricant to flow from the primary reservoir to the auxiliary reservoir and that close to prevent the lubricant to flow from the primary reservoir to the auxiliary reservoir,
- wherein the one or more auxiliary drain valves open when at least one of (i) a pressure of the lubricant in the primary lubrication system, (ii) a pressure of fuel in the turbine engine or (iii) a pressure of hydraulics of the turbine engine is less than a pressure threshold such that the auxiliary lubrication system supplies the lubricant from the auxiliary reservoir to the one or more rotating components.

2. The lubrication system of claim 1, wherein the turbine engine comprises an outer casing, and the primary reservoir is positioned within the outer casing.

3. The lubrication system of claim 1, wherein the auxiliary lubrication system further comprises an auxiliary lubricant supply line in fluid communication with the auxiliary reservoir and the one or more rotating components, the auxiliary lubrication system supplying the lubricant from the auxiliary reservoir to the one or more rotating components through the auxiliary lubricant supply line.

4. The lubrication system of claim 1, wherein the auxiliary lubrication system further comprises an auxiliary lubricant return line in fluid communication with the primary reservoir and the auxiliary reservoir such that the lubricant flows from the primary reservoir to the auxiliary reservoir through the auxiliary lubricant return line.

5. The lubrication system of claim 1, wherein the auxiliary lubrication system supplies the lubricant from the auxiliary reservoir to the one or more rotating components when at the least one of the pressure of the lubricant in the primary lubrication system, the pressure of the fuel in the turbine engine, or the pressure of the hydraulics of the turbine engine is less than a pressure threshold.

6. The lubrication system of claim 1, wherein the auxiliary lubrication system further comprises an auxiliary pump that pumps the lubricant from the auxiliary reservoir to the one or more rotating components.

7. The lubrication system of claim 6, wherein the auxiliary pump is positioned within the auxiliary reservoir.

8. The lubrication system of claim 1, wherein the one or more auxiliary drain valves close when the at least one of the pressure of the lubricant in the primary lubrication system, the pressure of the fuel in the turbine engine, or the pressure of the hydraulics of the turbine engine is greater than the pressure threshold.

9. The lubrication system of claim 1, further comprising a controller that controls one or more primary drain valves to open or to close the one or more primary drain valves.

10. The lubrication system of claim 9, wherein the controller further controls the one or more auxiliary drain valves to open or to close the one or more auxiliary drain valves.

11. A turbine engine comprising:

- a turbo-engine including a shaft;
- a fan drivingly coupled to the shaft of the turbo-engine, wherein rotation of the shaft causes the fan to rotate;
- one or more rotating components in at least one of the turbo-engine or the fan;
- an outer casing that surrounds the turbo-engine and the one or more rotating components; and a lubrication system for lubricating the one or more rotating components, the lubrication system comprising:

a primary reservoir that stores a lubricant therein;

a primary lubrication system supplying the lubricant from the primary reservoir to the one or more rotating components during normal operation of the turbine engine; and an auxiliary lubrication system comprising:

an auxiliary reservoir in fluid communication with the primary reservoir and the one or more rotating components and receiving the lubricant from the primary reservoir, the auxiliary reservoir positioned at substantially a six o'clock position of the turbine engine; and one or more auxiliary drain valves that open to allow the lubricant to flow from the primary reservoir to the auxiliary reservoir and that close to prevent the lubricant to flow from the primary reservoir to the auxiliary reservoir, wherein the one or more auxiliary drain valves open when at least one of (i) a pressure of the lubricant in the primary lubrication system, (ii) a pressure of fuel in the turbine engine, or (iii) a pressure of hydraulics of the turbine engine is less than a pressure threshold such that the auxiliary lubrication system supplies the lubricant from the auxiliary reservoir to the one or more rotating components.

12. The turbine engine of claim 11, wherein the primary reservoir is positioned within the outer casing.

13. The turbine engine of claim 11, wherein the auxiliary lubrication system further comprises an auxiliary lubricant supply line in fluid communication with the auxiliary reservoir and the one or more rotating components, the auxiliary lubrication system supplying the lubricant from the auxiliary reservoir to the one or more rotating components through the auxiliary lubricant supply line.

14. The turbine engine of claim 11, wherein the auxiliary lubrication system further comprises an auxiliary lubricant return line in fluid communication with the primary reservoir and the auxiliary reservoir such that the lubricant flows from the primary reservoir to the auxiliary reservoir through the auxiliary lubricant return line.

15. The turbine engine of claim 11, wherein the auxiliary lubrication system supplies the lubricant from the auxiliary reservoir to the one or more rotating components when the at least one of the pressure of the lubricant in the primary lubrication system, the pressure of the fuel in the turbine engine, or the pressure of hydraulics of the turbine engine is less than a pressure threshold.

16. The turbine engine of claim 11, wherein the auxiliary lubrication system further comprises an auxiliary pump that pumps the lubricant from the auxiliary reservoir to the one or more rotating components.

17. The turbine engine of claim 16, wherein the auxiliary pump is positioned within the auxiliary reservoir.

18. The turbine engine of claim 11, wherein the one or more auxiliary drain valves close when the at least one of the pressure of the lubricant in the primary lubrication system, the pressure of the fuel in the turbine engine, or the pressure of the hydraulics of the turbine engine is greater than the pressure threshold.

19. The turbine engine of claim 11, further comprising a gear assembly including a plurality of gears and one or more gear bearings, the one or more rotating components including at least one of the plurality of gears and the one or more gear bearings.

20. The turbine engine of claim 11, further comprising one or more engine bearings that support rotation of the shaft, the one or more rotating components including the one or more engine bearings.

* * * * *